(12) United States Patent
Samland

(10) Patent No.: US 6,487,950 B2
(45) Date of Patent: Dec. 3, 2002

(54) METHOD AND APPARATUS TO CLEAR MINEFIELDS

(76) Inventor: Thomas Samland, Fürstenbergstr. 11, 78166 Donaueschingen (DE)

( * ) Notice: Subject to any disclaimer, the term of this patent is extended or adjusted under 35 U.S.C. 154(b) by 0 days.

(21) Appl. No.: 09/771,571

(22) Filed: Jan. 30, 2001

(65) Prior Publication Data

US 2002/0108485 A1 Aug. 15, 2002

Related U.S. Application Data

(63) Continuation of application No. 09/057,324, filed on Apr. 9, 1998, now abandoned.

(30) Foreign Application Priority Data

Apr. 10, 1997 (DE) .......................................... 197 14 809
Oct. 10, 1997 (DE) .......................................... 197 44 794

(51) Int. Cl.⁷ ............................................... F41H 11/12
(52) U.S. Cl. ........................................ 89/1.13; 89/1.11
(58) Field of Search .................................. 89/1.11, 1.13

(56) References Cited

U.S. PATENT DOCUMENTS 3,766,635 A * 10/1973 Cranston .................... 29/472.9
4,325,305 A * 4/1982 Prastine ....................... 102/201
5,822,047 A * 10/1998 Contarino et al. .......... 356/5.01

FOREIGN PATENT DOCUMENTS

EP 305556 * 3/1989 ................. 89/1.13

OTHER PUBLICATIONS

English translation of Hoogen et al. (556).*

* cited by examiner

Primary Examiner—Stephen M. Johnson
(74) Attorney, Agent, or Firm—Dykema Gossett, PLLC

(57) ABSTRACT

A minefield is irradiated with coherent microwave energy at a first power level. Back radiation provides an indication of the position of the landmines. Coherent microwave radiation at a second power level high than the first is directed at the hidden mines to destroy the same. The microwave energy is produced by gyrotron oscillator.

22 Claims, 3 Drawing Sheets

METHOD AND APPARATUS TO CLEAR MINEFIELDS

This is a continuation of application Ser. No. 09/057,324, filed Apr. 9, 1998, now abandoned.

BACKGROUND OF THE INVENTION

The invention concerns a method to clear minefields and an apparatus to use it. Together with a mine-detection method this leads to an automatic mechanism for land mine clearance.

The hidden land mines are an almost world-wide problem. Their number is estimated to be more than 110 million. The minefields sown during wars are often not cleared afterwards. This fact becomes understandable when you consider that one mine costs about 10 $, but its clearance costs about 200 $ up to 1,000 $ (cf. [7], p. 21).

To solve this problem, it is necessary to develop a method that clears minefields efficiently, quickly, cheaply and reliably.

A further main problem is the great risk to health of persons clearing the minefields. Statistically, 0.1% of the mines being cleared cause an accident. In Kuwait more than 80 people clearing minefields lost their lives as reported in the press. So the clearance of an evacuated minefield from a distance is advantageous, because there is no damage to men or material. Especially the anti-tank mines and the anti-helicopter mines often sown together with anti-personnel mines are a great risk for the vehicle respectively the airplane clearing the mines.

SUMMARY OF THE INVENTION

The purpose of the invention is a civil clearance of generally-hidden landbased explosive devices, for instance land mines, especially anti-personnel mines (so called APM's). This means a clearance rate of more than 99.6% as demanded by the UN (cf. [6], p. 25).

This method works, even if the mine is a plastic mine or contains little metal. Fully metal-enclosed mines cannot be destroyed, but can be found with this method. Even other munitions, such as ammunition can be found and cleared.

The method consists in emitting specific concentrated high-power microwave radiation onto the minefield or onto the mine's location. To locate the hidden mines the minefield is irradiated by low-power radiation and the back-radiation is received in the microwave and/or the infrared spectrum. Then specific concentrated high-power microwave radiation is used to burn down the mine.

In order to locate the mines you can also use other well-known detecting methods, for instance as described in U.S. Pat. No. 5,592,170 and other patents (see list) or Sieber et al. [4].

This method intends to destroy mines automatically from a distance.

The wavelength of microwaves is within the cm up to the dm band, that is frequencies in the SHF and EHF- band according to DIN 40015.

A land mine consists of a cover that is often made of plastic and no longer of metal, which is why their detection is difficult. The mine consists essentially of a fuse with the detonator and the explosive charge with a lower sensitivity to impact, friction and temperature-change.

Physically, the explosive has a dielectric loss $P_d$ when irradiated by an electromagnetic wave, depending on the frequency f, the power of the electromagnetic wave, the dielectric number $\in_r$ of the material and the dissipation factor $\tan(\delta)$ of the explosive. So when irradiated by electromagnetic energy, the explosive of a not completely metal-enclosed mine absorbs part of the wave's energy (cf. FIG. 4). The dielectric power loss $P_d$ of the mine being directly exposed to the radiation is proportional to the product of the frequency f, the dielectric number $\in_r$ and the dissipation factor $\tan(\delta)$ of the explosive, whereas $\in_r$ and $\tan(\delta)$ also depend on the temperature and on the frequency f. (For highly polar materials such as water, the variation of the dielectric number $\in_r$ with frequency is dramatic, going from 80 at 60 Hz to 20 at 10 kHz, because permanent dipols can no more follow the rapid field change.)

At various discrete values of temperature and frequency there are quasi-resonances where the loss is locally very high. A sharpe rise in dielectric loss, usually accompanied by a rapid temperature increase, is an indication of impending breakdown. If the absorbed power is high enough, the mine will burn down. The effect depends on the dissipated power inside the mine:

1) The explosive will gas out at lower temperatures and be defused,
2) the explosive will be heated above the deflagration point and burns down, or detonates when heated above the fusion point,
3) the explosive detonates immediately because the electromagnetic effect leads to electrical breakdown of the explosive depending on it's dielectric strength.

The deflagration points and the fusion points of most explosives (as pure substances) are between 300 F. and 720 F. (cf. [5]).

If the electric field irradiating the explosive is increased to some critical magnitude, depending on the dielectric strength of the medium, the temperature, the medium surrounding the dielectric and on other factors, the material abruptly becomes conducting, a large current flows and local destruction occurs.

This electrical breakdown leads to detonation of an explosive device which is not metal-enclosed.

A further point of the invention is the use of microwave frequencies between 3 GHz and 80 GHz, so that the dielectric loss inside the explosive is high enough and the radiation penetrates the soil deeply enough.

Especially Industrial-Scientific-Medical (ISM) frequency bands according to EN 55011 and VDE 0875 are of advantage because there is no interference with radio operators and because they can effectively be generated by gyrotron oscillators according to claim 11 (see also FIG. 1). Using the ISM-frequency band of 61 GHz up to 61.5 GHz another advantage is the relatively high absorption of the stray radiation by the air at this frequency to avoid scattered radiation (no window frequency). The frequency of radiation in the known ISM-frequency band is around 5.800 GHz; 24.125 GHz; and 61.250 GHz.

The advantages of a gyrotron device besides the coherent and bundled high-power radiation compared to a magnetron radiation at say 0.91 GHz or 2.45 GHz are:

1) Because of the shorter wavelength at the higher frequency, the microwave radiation generated by a gyrotron device can be deflected and focused by relatively small quasi-optical reflectors (see (5) and (5') in FIGS. 1 to 4).
2) The absorbed power in the dielectric medium (here: the explosive in the mine) being directly exposed to the radiation increases with increasing frequency and dissipation factor which also grows with higher frequency. So, compared to 2.45 GHz the absorbed power at 61.25 GHz is about 400 times higher.

3) The higher frequency establishes a higher resolution as ground-penetrating radar.

A further possibility is the pulsed emission of microwave radiation even at a higher power level. This can be done by a gyrotron device. We suggest emitting more than one pulse on each mine.

According to claim 3 you get a frequency band which penetrates the soil deeply enough and is absorbed adequately by the explosive.

Even higher frequencies do not penetrate the ground deeply enough because of their short wavelength (i.e. the function P1 decreases with decreasing λ).

Because microwaves in the frequency band of 3 GHz up to 80 GHz are well absorbed by dielectric substances and because gyrotrons are masers with high power output of more than 10 kW cw, and total efficiency η of more than 50%, whose coherent radiation can be deflected and focused by small quasi-optical reflectors, we suggest to clear land-based minefields by defusion or explosion of the hidden mines by high-power microwave radiation.

Especially the use of radiation at a ISM-frequency of 61.250 GHz has the advantage that the stray radiation will be well absorbed by the air (no window frequency), so the scattered radiation is low.

We suggest using a gyrotron oscillator with a permanent magnet and a water edge-cooled microwave transmission window. This equipment is easy to handle and of low volume. The invented apparatus will be provided with quasi-optical reflectors in order to reflect and focus the emitted microwave radiation according to claim 13.

Gyrotrons with kW power rating and frequencies around 30 GHz are lately used for technological applications to heat ceramics by dielectric loss in a closed cavity (cf. [1], p. 32 or [2], p. 22). To use the maser for technical applications, you even can focus the radiation on an area of less than 0.2 square inch (cf. [8], p. 8).

Last but not least, the invention suggests to fit the microwave emitter in a vehicle or an airplane, for instance a helicopter. An electric power generator supplies the equipment with electric energy.

The electronics of the vehicle must be electromagnetically shielded against the stray radiation. In addition, the microwave equipment is shielded except for the radiation exit (see FIG. 3).

BRIEF DESCRIPTION OF THE DRAWINGS

The effect of the invention is shown by four drawings. They show in detail.

DESCRIPTION OF THE INVENTION

Figure 1:
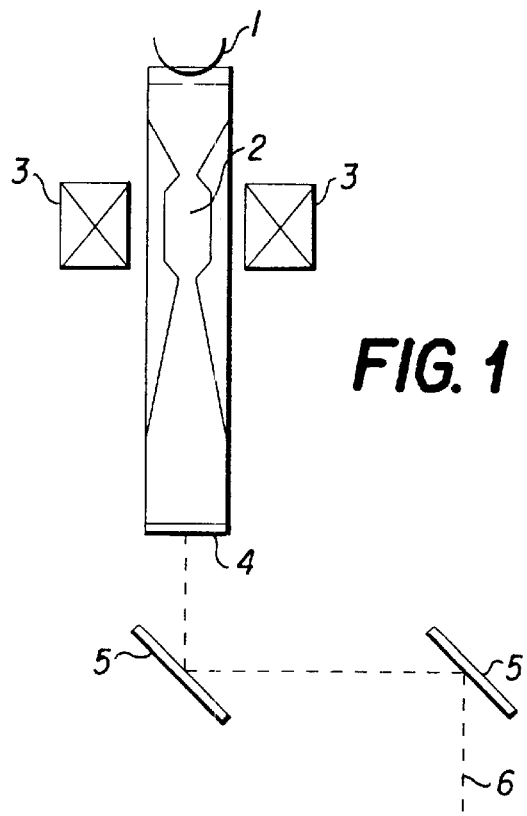
FIG. 1 the principle of a conventional gyrotron oscillator (current state of technology, cf. [1], p. 5), FIG. 2 the use of quasi-optical reflectors to reflect and focus the microwave beam, FIG. 3 the installation of the equipment in the helicopter and the method of irradiating the mine, FIG. 4 the principal method to clear the minefields and FIG. 5 the decrease of emitted power in the soil (showed by function P1) and in the mine (explained by function P2) and the resulting dielectric loss $P_d = P1 - P2$ within the mine.

In FIG. 1 we see the principle of a conventional gyrotron oscillator: The electrons emitted and accelerated by the electron gun (1) are forced by a magnetic field to oscillate transverse to the direction of beam motion within the resonator (2). So the braked electrons partially deliver their energy to the electromagnetic field that is built by stimulated emission of radiation. The magnetic field is generated by (often superconducting) magnets (3). The generated coherent electromagnetic radiation (6) leaves the gyrotron through a microwave transmission window (4) and will be reflected and focused afterwards by quasi-optical reflectors (5) and (5').

Figure 2:
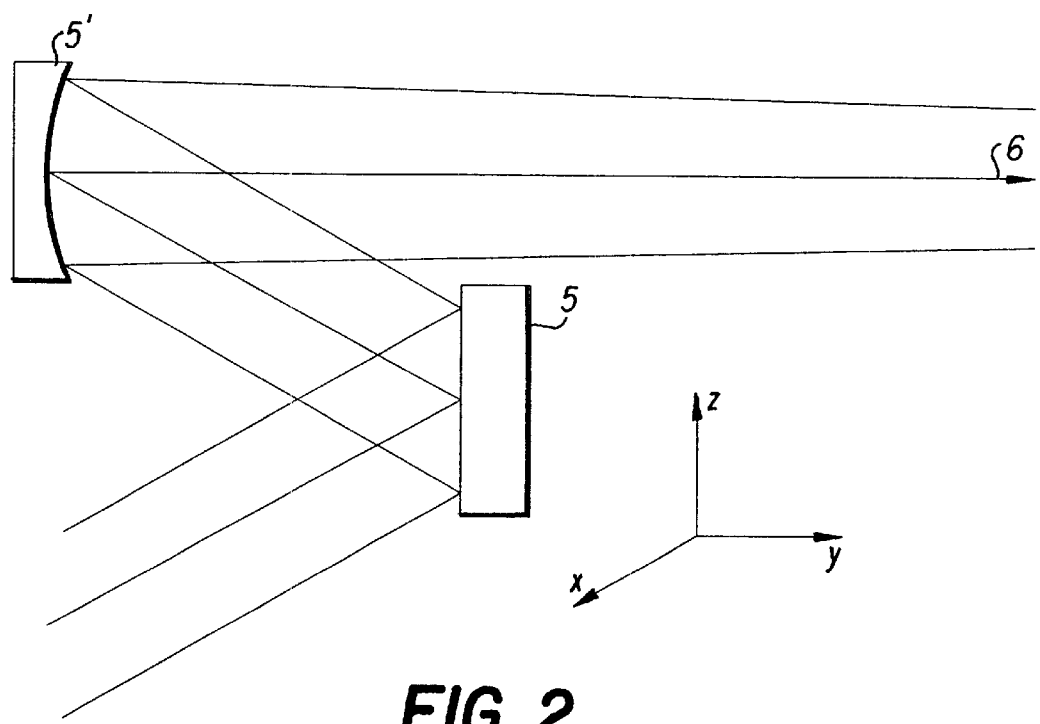

FIG. 2 shows schematically the use of quasi-optical reflectors (5) and (5') to reflect and to focus the microwave beam (6). Here the radiation successively meets the flat reflector (5) and then the focusing parabolic reflector (5'). Let the x-axis of a co-ordination system be towards the spectator, then the microwave beam (6) will be deflected by turning the second reflector (5') around its x-axis or its z-axis. So the microwave beam (6) reaches a restricted area. The quasi-optical reflector 5 may be formed of suitable materials such as copper, aluminum and graphite.

Simultaneous moving of the parabolic reflector (5') along its y-axis and a suitable rotation of the reflector (5) around its x-axis leads to a change in focusing and therefor in the focal length of the microwave beam.

Figure 3:
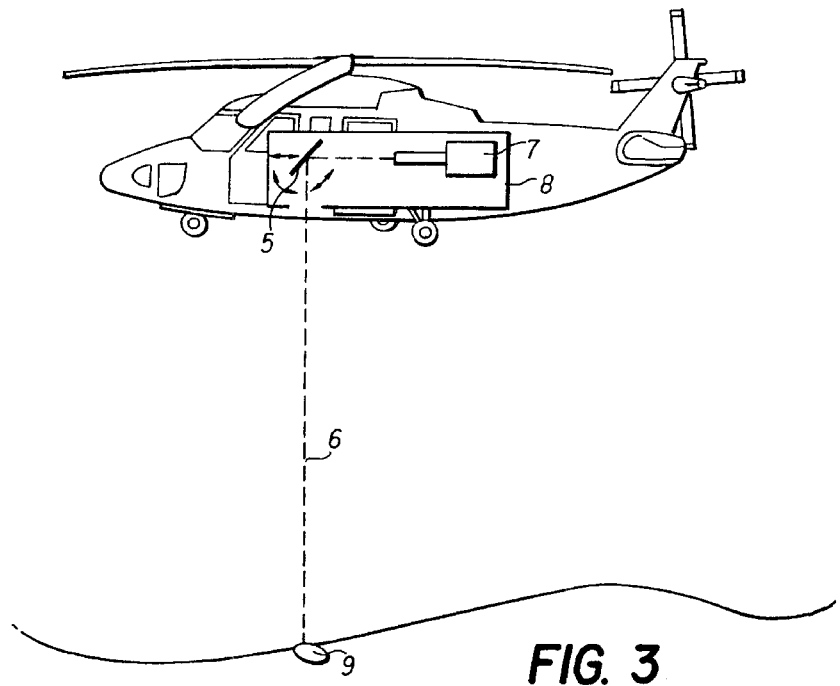

We see in FIG. 3 the installation of the equipment in a helicopter, especially a quasi-optical reflector (5), the microwave radiation beam (6), the microwave emitter (7), the electromagnetic shielding (8) around the equipment inside the helicopter, and a hidden mine (9) actually burned down by the microwave radiation.

Figure 4:
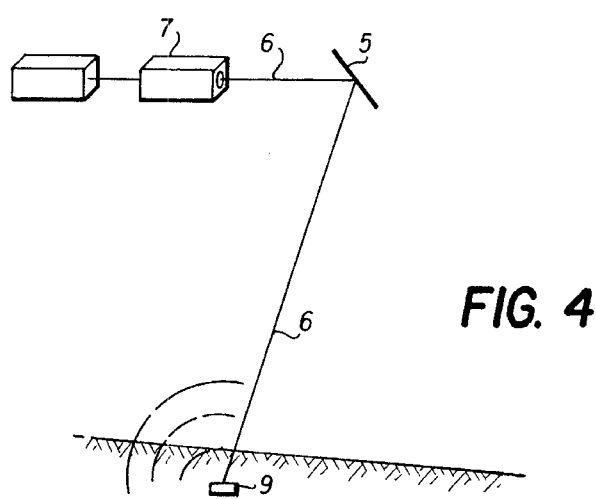

In FIG. 4 we see the principal method to clear the minefields: The microwave radiation (6) emitted by the microwave generator (7) and reflected with the help of a mirror (5) burns down the hidden mine (9) in the soil.

Figure 5:
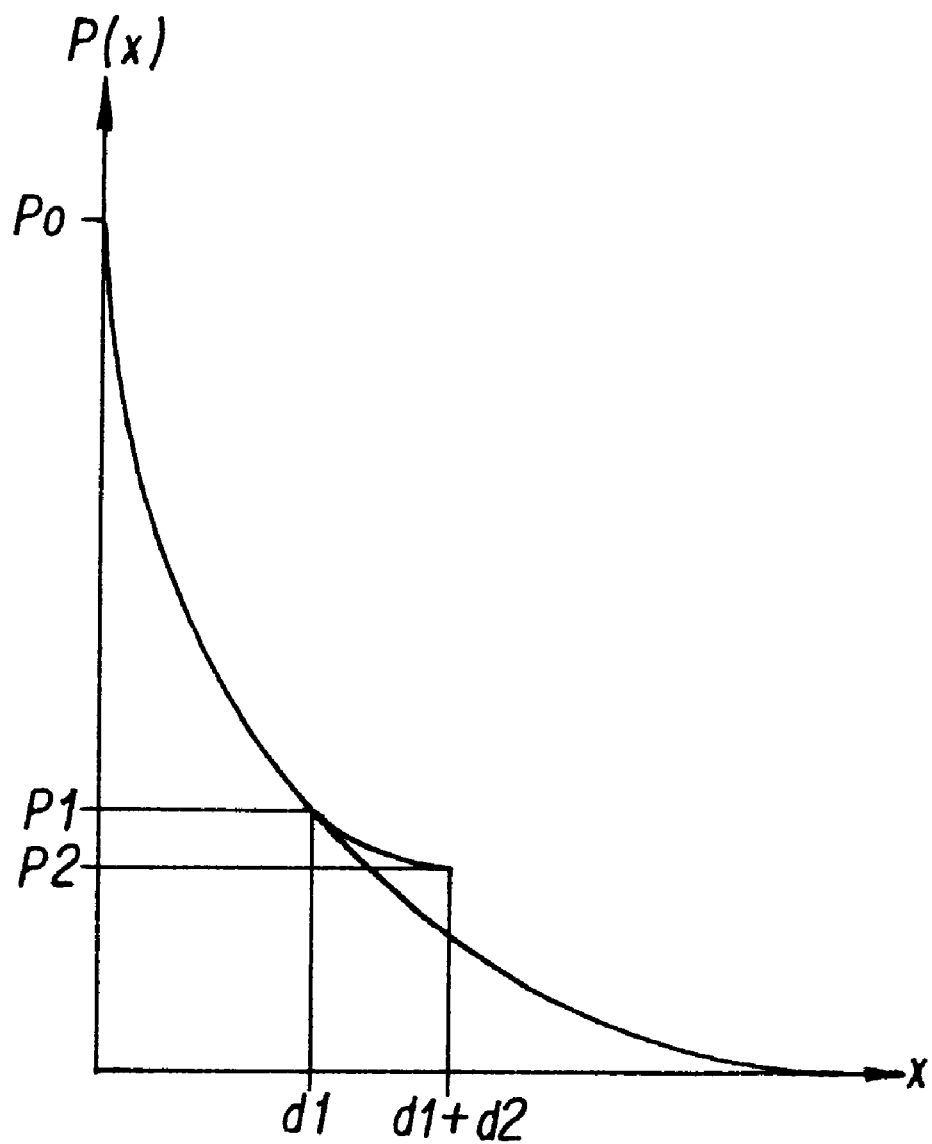

Now FIG. 5 demonstrates by function the dielectric loss within the mine. Here P(x) means the actual power effective in the depth x of the soil. Let Po be the power emitted by the microwave source. Now we assume the mine is lying in the depth d1 under the soil. Then a part of the power is absorbed by the soil, and so the power decreases to P1=P1(d1) being $$P1 = Po \, e^{-\frac{2\pi}{\lambda}\sqrt{\varepsilon_r}\,\tan(\delta 1) d},$$

with dielectric number $\varepsilon_r$ and dissipation factor tan(δ1) of the soil and λ=wavelength of the microwave in vacuum, for instance 1 cm for a frequency f=30 GHz. On condition that the radiation permeates the mine's cover without significant loss, especially when the mine is not metal-enclosed, the power within the mine of width d2 decreases to a level P2=P(d2) with power factor P1:

$$P2 = P1 \, e^{-\frac{2\pi}{\lambda}\sqrt{\varepsilon_r'}\,\tan(\delta 2) d2},$$

with dielectric number $\varepsilon_r'$ and dissipation factor tan(δ2) of the explosive. As a result, the dielectric loss within the mine is $P_d = P1 - P2$.

REFERENCES CITED

U.S. PATENT DOCUMENTS

| | | | |
|---|---|---|---|
| US-PS 5,592,170 | | 7/1997 | Price et al. |

FOREIGN PATENT DOCUMENTS

| | | | |
|---|---|---|---|
| DE | 196 00 591 | 7/1997 | Germany |
| DE | 27 26 972 | 1/1979 | Germany |
| DE | 38 24 441 | 1/1990 | Germany |
| 07294193 A | | 11/1995 | Japan |
| 08271197 A | | 10/1996 | Japan |

OTHER PUBLICATIONS

[1] Thumm, Manfred (1994): State-of-the-Art of High Power Gyro-Devices and Free Electron Masers 1994, Forschungszentrum Karlsruhe (FZKA), Germany, nr. 5564.
[2] Like [1], Update 1996, FZKA, Germany, nr. 5877.
[3] Thumm, Manfred et al. (1996): ITER ECH Window Development, Final Report, FZKA, Germany, nr. 5808.
[4] Sieber, A. et al. (1995): Anti-personnel mine detection by using polarimetric microwave imaging, JRC, Ispra, Italy/Daimler Benz, Germany. In: Detection Technology for Mines and minelike Targets, Orlando, USA, Apr. 17–21, 1995, Bd. 2496, pp. 14–19.
[5] Meyer, Rudolf (1973): Explosivstoffe, Verlag Chenie, Weinheim, Germany, third edition.
[6] International Expert Conference on Mechanical Mine Clearance, Petersberg/Bonn, Germany, Dec. 11–12, 1996.
[7] United Nations Institute for Disarmament Research (UNIDIR) NewsLetter, Number SI 3/97.
[8] N.N. (1994): Uniform materials quality by thorough heating, KfK, Karlsruhe, Germany. In: Blick durch die Wirtschaft, Oct. 12, 1994, Bd. 37, issue 197.

SIGN DECLARATION $P_d$ dielectric loss in watts
$\in_r$ dielectric number of the material
tan tangent
tan($\delta$) dissipation factor of the material
cw continuous wave
$\eta$ total efficiency

What is claimed is:

1. A method to clear minefields containing hidden land mines buried in the soil below the surface at various positions comprising the steps of:
producing specific emission of coherent microwave radiation for penetrating the soil; and
directing the microwave radiation at the minefield containing the hidden mines so that the microwave radiation penetrates the soil for absorbtion by the hidden mines for determining the various positions of the hidden mines and so that the microwave radiation absorbed by the hidden mines destroys said hidden mines.

2. The method according to claim 1, wherein directing the microwave radiation at the minefield comprises the steps of:
irradiating the minefield with microwave radiation at a first power level;
receiving back-radiation from the minefield indicative of the various positions of the hidden mines; and
irradiating the various positions of the hidden mines with microwave radiation at a second power level higher than that first power level to destroy the so located mines from a distance.

3. The method according to claim 2, wherein the back radiation includes back scattered microwave radiation.

4. The method according to claim 2, wherein the microwave radiation at the first power level causes the hidden mines to become heated thereby producing infrared radiation and the back radiation from the minefield includes said infrared radiation.

5. The method according to claim 1, comprising the step of using microwave radiation in a frequency band of about 3 GHz to about 80 GHz.

6. The method according to claim 1, comprising the step of using microwave radiation in a frequency band of at least one of about 5.800 GHz; 24.125 GHz; and 61.250 GHz.

7. The method according to claim 1, wherein the microwave radiation has an output power of at least about 10 kW.

8. The method according to claim 1, comprising the step of pulsing the microwave radiation.

9. The method according to claim 1, comprising the step of pulsing the microwave radiation at least once.

10. The method according to claim 1, wherein the mine contains an explosive having a frequency dependent dielectric loss and dissipation factor comprising the step of using a frequency f at which the dielectric loss and dissipation factor of the explosive are relatively high for causing the explosive to become heated.

11. The method according to claim 1, comprising the step of irradiating the minefield so that the radiation permeates the soil sufficiently to destroy the mine.

12. An apparatus to clear minefields according to the method of claim 1, comprising a gyrotron oscillator for generating a beam of coherent microwave radiation.

13. The apparatus according to claim 12, wherein the gyrotron oscillator includes a permanent magnet and an edge water cooled microwave transmission window providing an exit path for the beam.

14. The apparatus according to claim 13, including quasi-optical reflectors in the exit path of the beam for focusing and deflecting the beam.

15. The apparatus according to claim 14, wherein the quasi-optical reflectors include at least one of a flat reflector and a parabolic reflector.

16. The apparatus according to claim 14, wherein the quasi-optical reflectors are formed of at least one of copper, aluminum and graphite.

17. The apparatus according to claim 12, wherein the apparatus is installed in a remotely controlled vehicle.

18. The apparatus according to claim 12, comprising shielding around the gyrotron oscillator.

19. A method to clear minefields containing hidden land mines buried in the ground below the surface at various positions comprising the steps of:
producing specific emission of coherent ground penetrating microwave radiation; and
directing the microwave radiation at various position in the minefield for absorbtion by the hidden mines thereat for determining the various positions of the hidden mines, and for destroying the so located hidden mines.

20. A method to clear mine fields containing hidden land mines hidden below the surface of the minefield at various positions therein comprising the steps of:
producing specific emission of ground penetrating coherent microwave radiation;
directing the microwave radiation at the minefield for absorbtion by the hidden mines for deterring the various positions of the hidden mines; and directing the microwave radiation at the so located hidden mines so that the microwave energy absorbed thereby is sufficient to destroy the mines at a distance.

21. A method to clear mine fields containing hidden land mines at various positions comprising the steps of:

producing specific emission of coherent microwave radiation;

irradiating the minefield with the coherent microwave radiation at a first power level;

receiving back-radiation from the minefield;

determining the various positions of the hidden mines; and irradiating the various positions of the so located hidden mines with coherent microwave radiation at a second power level higher than that first power level so that the microwave radiation is absorbed by the mines for destroying the so located hidden mines from a distance.

22. A method to clear minefields containing hidden land mines at various positions comprising the steps of:

producing specific emission of coherent microwave radiation:

directing the microwave radiation at the minefield containing the hidden mines including:

irradiating the minefield with microwave radiation at a first power level;

receiving back-radiation from the minefield indicative of the various positions of the hidden mines; and determining the various positions of the hidden mines in response to the back-radiation;

irradiating the various positions of the hidden mines with microwave radiation at a second power level higher than that first power level so that the microwave radiation is absorbed by the hidden mines for destroying the so located hidden mines from a distance.

* * * * *